US012598370B2

(12) United States Patent
Qin

(10) Patent No.: US 12,598,370 B2
(45) Date of Patent: Apr. 7, 2026

(54) ELECTRONIC DEVICE

(71) Applicant: VIVO MOBILE COMMUNICATION CO., LTD., Guangdong (CN)

(72) Inventor: Feixiang Qin, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 633 days.

(21) Appl. No.: 17/956,610

(22) Filed: Sep. 29, 2022

(65) Prior Publication Data

US 2023/0022679 A1  Jan. 26, 2023

Related U.S. Application Data

(63) Continuation of application No. PCT/CN2021/083906, filed on Mar. 30, 2021.

(30) Foreign Application Priority Data

Mar. 30, 2020 (CN) .......................... 202010239683.1

(51) Int. Cl.
*H04N 23/57* (2023.01)
*H04M 1/02* (2006.01)
*H04N 23/54* (2023.01)

(52) U.S. Cl.
CPC .......... *H04N 23/57* (2023.01); *H04M 1/0264* (2013.01); *H04M 1/0266* (2013.01); *H04N 23/54* (2023.01)

(58) Field of Classification Search
CPC .. H04M 1/0264; H04M 1/0266; H04M 1/185; H04M 1/0202; H04M 1/0268;
(Continued)

(56) References Cited

U.S. PATENT DOCUMENTS

2019/0339746 A1* 11/2019 Kim ..................... H04M 1/0264
2020/0236260 A1* 7/2020 Yang ..................... H04N 23/57
(Continued)

FOREIGN PATENT DOCUMENTS

CN  105554352 A  5/2016
CN  208110687 U  11/2018
(Continued)

OTHER PUBLICATIONS

International Search Report and Written Opinion for Application No. PCT/CN2021/083906, dated Jun. 9, 2021, 9 Pages.
(Continued)

*Primary Examiner* — Quoc Thai N Vu
(74) *Attorney, Agent, or Firm* — BROOKS KUSHMAN P.C.

(57) ABSTRACT

An electronic device, including a housing, a display screen, a mainboard support, and a camera. A first mounting portion is arranged on the housing. The display screen is mounted on the housing, a mounting cavity is formed between the display screen and the housing, and the display screen has a light-transmitting hole. The mainboard support is mounted on the housing, located inside the mounting cavity, and arranged spaced apart from the display screen. A second mounting portion is arranged on the mainboard support. The camera is located inside the mounting cavity, is arranged facing the light-transmitting hole, and matches the first mounting portion and the second mounting portion respectively, to be positioned between the housing and the mainboard support. A minimum distance n between the camera and the display screen satisfies: 0.15 mm≤n<0.4 mm.

19 Claims, 3 Drawing Sheets

(58) Field of Classification Search
CPC .. H04M 1/026; H04M 2250/52; H04M 1/724;
H04M 2201/38; H04N 23/50; H04N
23/54; H04N 23/57
See application file for complete search history.

(56) References Cited

U.S. PATENT DOCUMENTS

| | | | | |
|---|---|---|---|---|
| 2021/0357003 A1* | 11/2021 | Wen | .................... | H04M 1/0266 |
| 2022/0197339 A1* | 6/2022 | Bao | ........................ | H04N 23/57 |

FOREIGN PATENT DOCUMENTS

| | | | | | |
|---|---|---|---|---|---|
| CN | 110049161 A | * | 7/2019 | .......... | H04M 1/0264 |
| CN | 110191272 A | | 8/2019 | | |
| CN | 209964150 U | | 1/2020 | | |
| CN | 110769095 A | | 2/2020 | | |
| CN | 111432101 A | | 7/2020 | | |
| EP | 3996359 A1 | | 11/2022 | | |
| JP | 2007028544 A | | 2/2007 | | |

OTHER PUBLICATIONS

Extended European Search Report for Application No. 21780871.6, Dated Aug. 23, 2023, 10 Pages.

* cited by examiner

A

ELECTRONIC DEVICE

CROSS-REFERENCE TO RELATED APPLICATIONS

This application is a continuation of PCT International Application No. PCT/CN2021/083906 filed on Mar. 30, 2021, which claims priority to Chinese Patent Application No. 202010239683.1 filed on Mar. 30, 2020, which are incorporated herein by reference in their entireties.

TECHNICAL FIELD

The present disclosure relates to the field of communication device technologies, and in particular, to an electronic device.

BACKGROUND

As users have extremely high requirements for functions and appearances of electronic devices, increasing a ratio of a display screen has become a development trend. For example, a retractable camera is adopted. However, the retractable camera has relatively high costs. Therefore, pole-screen electronic devices have become a mainstream.

However, for pole-screen electronic devices in the related art, to increase a display ratio of a display screen, a viewing aperture on the display screen needs to be reduced. Once the viewing aperture is reduced, the resolving power of a camera when being stressed is degraded, resulting in cracking of the display screen. Therefore, it is difficult to increase the display ratio while reducing the viewing aperture on the display screen.

SUMMARY

The present disclosure discloses an electronic device, to resolve the problem that for an existing electronic device, it is difficult to increase a display ratio while reducing a viewing aperture on a display screen.

To resolve the foregoing problem, the present disclosure adopts the following technical solution:

An electronic device is provided, including a housing, a display screen, a mainboard support, and a camera. A first mounting portion is arranged on the housing. The display screen is mounted on the housing, a mounting cavity is formed between the display screen and the housing, and the display screen has a light-transmitting hole. The mainboard support is mounted on the housing, located inside the mounting cavity, and arranged spaced apart from the display screen. A second mounting portion is arranged on the mainboard support. The camera is located inside the mounting cavity, is arranged facing the light-transmitting hole, and matches the first mounting portion and the second mounting portion respectively, to be positioned between the housing and the mainboard support. A distance between the camera and the display screen satisfies: 0.15 mm≤n<0.4 mm.

The technical solution adopted in the present disclosure can achieve the following beneficial effects:

In the electronic device disclosed in embodiments of the present disclosure, the first mounting portion is arranged on the housing, the second mounting portion is arranged on a mainboard support, and the camera matches the first mounting portion and the second mounting portion respectively, so that the camera is positioned between the housing and the mainboard support, which can improve the power of the camera in the pole-screen electronic device in resolving an external force when the camera is stressed and reduce the probability of cracking of the display screen. In addition, the distance between the camera and the display screen is set to a range of 0.15 mm to 0.4 mm, which can reduce a light-transmitting hole on the display screen and increase the display ratio, thereby resolving the problem that it is difficult to increase the display ratio while reducing a viewing aperture on the display screen.

BRIEF DESCRIPTION OF THE DRAWINGS

Accompanying drawings described herein are used for providing further understanding about the present disclosure, and constitute one portion of the present disclosure. Exemplary embodiments of the present disclosure and descriptions thereof are used for explaining the present disclosure, and do not constitute an inappropriate limitation on the present disclosure. In the accompanying drawings.

DESCRIPTION OF REFERENCE SIGNS

100—electronic device;
10—first mounting portion; 110—first mounting through hole; 11—frame; 111—sink;
2—display screen; 20—light-transmitting hole;
3—mainboard support; 30—second mounting portion (that is, mounting groove); 31—main support; 32—mounting support; 321—connecting portion; 322—supporting portion; 323—boss;
4—camera;
5—camera support; 50—second mounting through hole; 51—first carrying portion; 52—second carrying portion; 53—connecting section;
6—first buffer member;
7—second buffer member;
8—connecting glue.

DETAILED DESCRIPTION

To clearly state the objectives, technical solutions, and advantages of the present disclosure, the technical solutions of the present disclosure will be clearly described below with reference to specific embodiments of the present disclosure and corresponding accompanying drawings. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
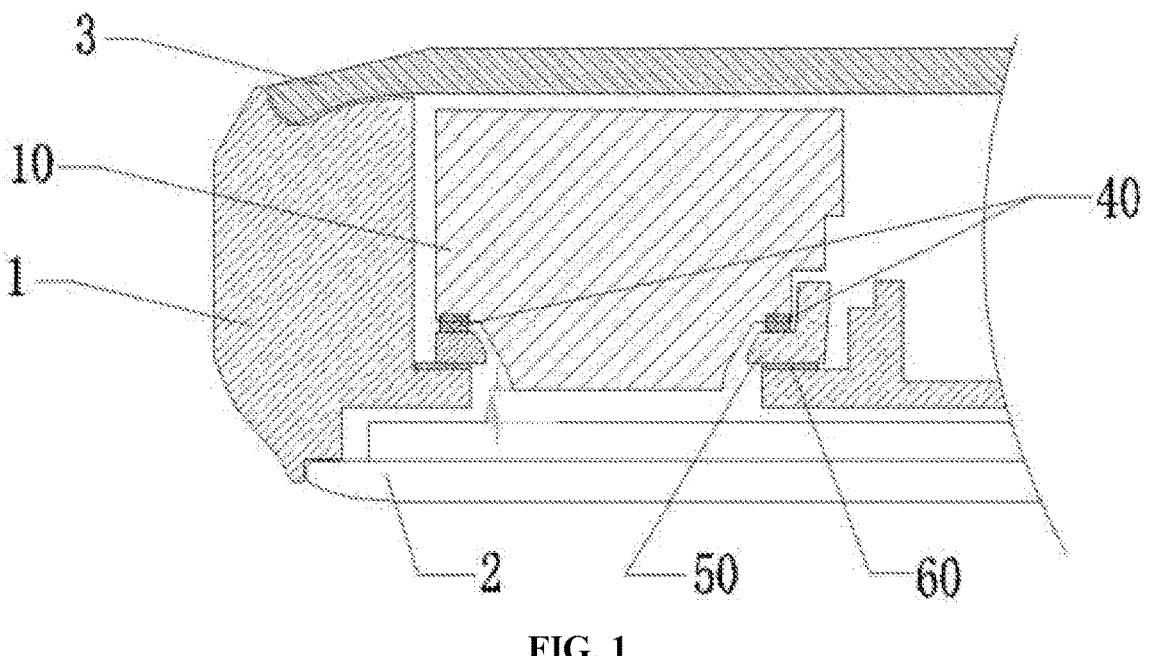
FIG. 1 is a schematic partial cross-sectional view of an electronic device in the related art.

A pole-screen electronic device in the related art is first described below with reference to FIG. 1.

In the pole-screen electronic device, a front-facing camera is arranged under a display screen, and a light-transmitting hole is provided on the display screen for framing by the front-facing camera. FIG. 1 is a partial cross-sectional view of a pole-screen electronic device in the related art. The pole-screen electronic device mainly includes a housing 1, a display screen 2, a back cover 3, a camera 10, and a camera support 50. The camera support 50 is fixed on the housing 1 by using a support glue 60, the camera 10 is assembled and fixed on the camera support 50 by using foam 40, and the back cover 3 provides support at the bottom of the camera 10.

However, in the foregoing structure, since imaging of the camera 10 requires a specific viewing angle, a relatively large distance (generally greater than 5 mm) is generally reserved between the camera 10 and the display screen 2, resulting in a relatively large opening of screen printing (that is, a viewing aperture of the camera), which may reduce a display ratio, that is, reduce a display ratio of the display screen.

To improve the delicacy and fineness of appearance, a small distance needs to be reserved. In the foregoing structure, if the distance between the camera 10 and the display screen 2 is reduced, the camera 10 is likely to hit the display screen when the electronic device is subject to an external force at a position at which the camera 10 is located, resulting in that the power of the camera 10 in resolving an external force is degraded and that the display screen is prone to cracking.

Therefore, the pole-screen electronic device in the related art has the problem that it is difficult to increase the display ratio while reducing the viewing aperture on the display screen.

To resolve the foregoing problem existing in the related art, the technical solutions of the present disclosure are provided. The technical solutions disclosed in the embodiments of the present disclosure are described below in detail with reference to the accompanying drawings.

Figure 2:
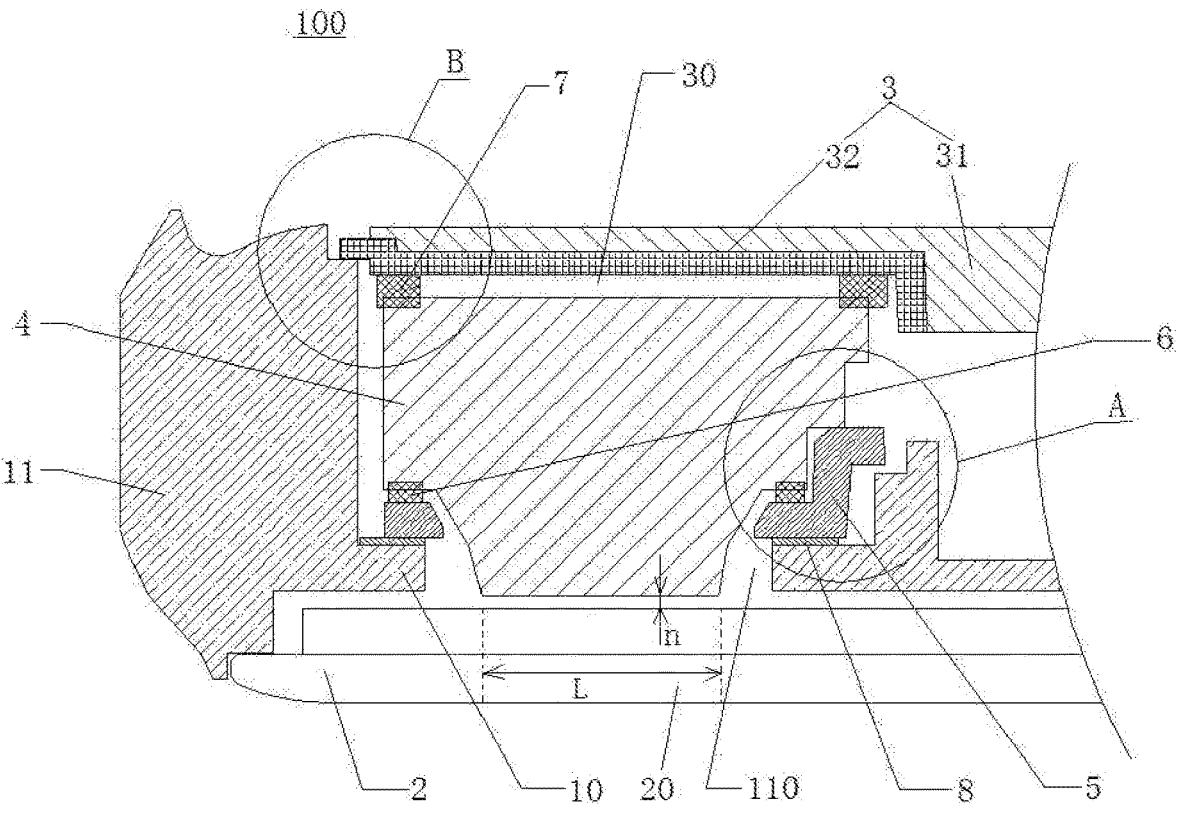
FIG. 2 is a schematic partial cross-sectional view of an electronic device according to an embodiment of the present disclosure.

As shown in FIG. 2, an electronic device 100 according to an embodiment of the present disclosure includes: a housing, a display screen 2, a mainboard support 3, and a camera 4. A first mounting portion 10 is arranged on the housing. The display screen 2 is mounted on the housing, a mounting cavity is formed between the display screen 2 and the housing, and the display screen 2 has a light-transmitting hole 20. The mainboard support 3 is mounted on the housing, located inside the mounting cavity, and arranged spaced apart from the display screen 2. A second mounting portion 30 is arranged on the mainboard support 3. The camera 4 is located inside the mounting cavity, is arranged facing the light-transmitting hole 20, and matches the first mounting portion 10 and the second mounting portion 30 respectively to be positioned between the housing and the mainboard support 3. The light-transmitting hole 20 is used as a viewing aperture of the camera 4. A distance n between the camera 4 and the display screen 2 satisfies: $0.15$ mm$\leq$n$<0.4$ mm. That is, the distance n between the camera 4 and the display screen 2 may be set to any value in a range of 0.15 mm to 0.4 mm, for example, 0.15 mm, 0.2 mm, 0.3 mm, and 0.38 mm.

In the electronic device 100 according to this embodiment of the present disclosure, the first mounting portion 10 is arranged on the housing, the second mounting portion 30 is arranged on the mainboard support 3, and the camera 4 matches the first mounting portion 10 and the second mounting portion 30 respectively, so that the camera 4 is positioned between the housing and the mainboard support 3, which can improve the power of the camera 4 in the pole-screen electronic device 100 in resolving an external force when the camera 4 is stressed, and reduce the probability of cracking of the display screen 2. In addition, the distance between the camera 4 and the display screen 2 is set to a range of 0.15 mm to 0.4 mm, which, on the one hand, can reduce the light-transmitting hole 20 on the display screen 2 and increase the display ratio of the display screen 2, and on the other hand, can make the camera 4 keep some resolving power after the camera 4 is stressed, thereby resolving the problem that it is difficult to increase the display ratio while reducing the viewing aperture on the display screen 2.

In some embodiments of the present disclosure, a maximum diameter L of the light-transmitting hole 20 satisfies: L$\leq$10 mm. That is, the diameter of the light-transmitting hole 20 may be 9 mm, 8 mm, 8.5 mm, or the like. As described above, by reducing a minimum distance between the camera 4 and the display screen 2, an imaging angle requirement of the camera 4 can be met by a light-transmitting hole 20 with a relatively small size, thereby reducing the light-transmitting hole 20 and increasing the display ratio of the display screen 2.

According to some embodiments of the present disclosure, the electronic device 100 further includes a first buffer member 6. The first buffer member 6 is connected between the camera 4 and the first mounting portion 10. When the electronic device 100 is subject to an external force, the first buffer member 6 may provide a buffering effect for the camera 4, to improve the power of the camera 4 in resolving the force, thereby avoiding damage and improving reliability.

Optionally, the first buffer member 6 may be a flexible member such as foam or soft rubber. Therefore, the first buffer member 6 can provide buffering through its own elastic deformation with low costs and a good buffering effect.

Figure 3:
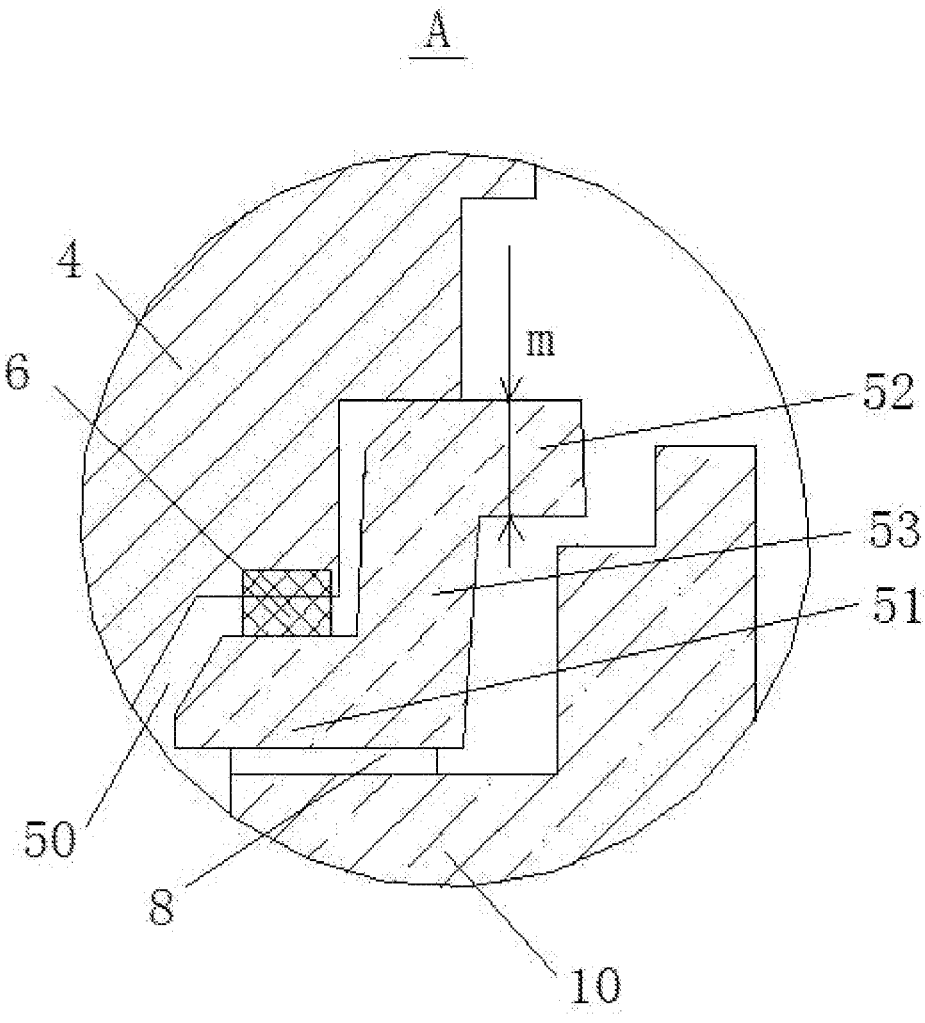
FIG. 3 is an enlarged view of a part A circled in FIG. 2.
Figure 4:
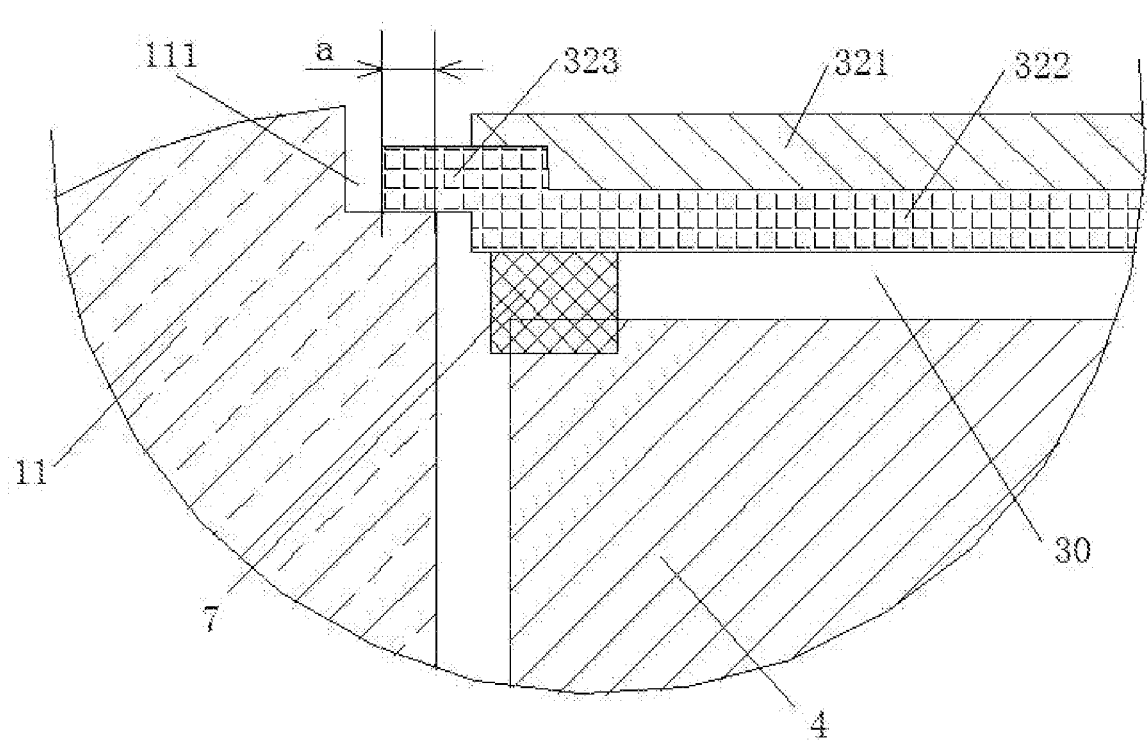
FIG. 4 is an enlarged view of a part B circled in FIG. 2.

According to some embodiments of the present disclosure, as shown in FIG. 2 to FIG. 4, the housing includes a frame 11. The display screen 2 is mounted at a first end (that is, a lower end shown in the figure) in a thickness direction of the frame 11. The first mounting portion 10 is located inside the mounting cavity, connected to the frame 11, arranged adjacent to the display screen 2, and provided with a first mounting through hole 110. The camera 4 penetrates through the first mounting through hole 110 and corresponds to the light-transmitting hole 20. The first buffer member 6 is located on a side of the first mounting portion 10 away from the display screen 2. Therefore, a size of the electronic device 100 in the thickness direction may be reduced. In addition, that the camera 4 extends into the first mounting through hole 110 can improve the assembly stability and enhance the power of the camera 4 in resolving a force when the camera 4 is stressed.

The housing further includes a back cover (not shown in the figure). The back cover is connected to the frame 11, and matches both the frame 11 and the display screen 2 to form the mounting cavity. In this way, the mounting cavity may be sealed by the back cover, thereby providing protection for internal devices.

In some embodiments, the electronic device 100 further includes a camera support 5. The camera support 5 is sleeved on the camera 4, connected to the first mounting portion 10, and provided with a second mounting through hole 50. The camera 4 penetrates through the second mounting through hole 50. The first buffer member 6 is connected between the camera 4 and the camera support 5. Therefore, the camera support 5 can provide support and protection for the camera 4. Arranging the first buffer member 6 between the camera 4 and the camera support 5 not only can provide a better buffering effect for the camera 4, but also can facilitate assembly, thereby reducing an assembly time and costs.

As shown in FIG. 3, the camera support 5 includes a first carrying portion 51, a second carrying portion 52, and a connecting section 53. In the thickness direction of the frame 11, one end of the first carrying portion 51 is connected to the first mounting portion 10, and an other end of the first carrying portion 51 is connected to the first buffer member 6. The second carrying portion 52 is located on a side of the camera 4 away from the frame 11 and located, in the thickness direction of the frame 11, on a side of the first carrying portion 51 away from the display screen 2. In the thickness direction of the frame 11, the first mounting portion 10 is abutted against one end of the second carrying portion 52, and the camera 4 is abutted against an other end of the second carrying portion 52. The connecting section 53 is located between the first carrying portion 51 and the second carrying portion 52. One end of the connecting section 53 is connected to a radially outer end of the first carrying portion 51, and an other end of the connecting section 53 is connected to the second carrying portion 52.

That is, the first carrying portion 51 is connected to the camera 4 and the first mounting portion 10. In an example shown in FIG. 4, the first carrying portion is adhered and connected to the first mounting portion 10 by using a connecting glue 8. The connecting section 53 is connected to the first carrying portion 51 and the second carrying portion 52. The first carrying portion 51 and the connecting section 53 jointly form an assembly step, and the camera 4 is connected to the assembly step by the first buffer member 6 to implement positioning. The second carrying portion 52 is connected to the camera. The second carrying portion 52 and the connecting section 53 jointly form an assembly step, and the camera 4 is abutted against the assembly step to implement positioning.

It may be understood that, the arrangement of the two assembly steps may provide support for the camera 4 at two positions. A combination of the first buffer member 6 and one assembly step can provide a buffered supporting force for the camera 4, so that the camera 4 has a better analyzing power when being stressed, thereby greatly reducing the probability of damage to the camera 4 and cracking of the display screen 2, thereby improving the reliability.

Optionally, the first buffer member 6 is ring-shaped. The first carrying portion 51 is constructed as an annular carrying portion, and a size m of the second carrying portion 52 in the thickness direction of the frame 11 satisfies: m≥0.3 mm. In other words, the first buffer member 6 may provide buffering and support for the camera 4 in the entire circumferential direction. The size of the second carrying portion 52 in the thickness direction of the frame 11 is at least 0.3 mm, that is, the thickness of the skirt of the camera support 5 is 0.3 mm and above. Therefore, the strength of the second carrying portion 52 may be enhanced, to improve the carrying capability of the second carrying portion 52 and provide reliable support for the camera 4, thereby improving the reliability and stability. For example, the thickness of the second carrying portion 52 may be 0.3 mm, 0.4 mm, 0.45 mm, or the like. With this regard, a person skilled in the art may set the thickness by comprehensively considering factors such as a carrying requirement, a spatial layout, and costs, which are not specifically limited in the present disclosure.

According to some embodiments of the present disclosure, the electronic device 100 further includes a second buffer member 7. The second buffer member 7 is connected between the camera 4 and the second mounting portion 30. Therefore, when the electronic device 100 is subject to an external force, the second buffer member 7 may provide a buffering effect for the camera 4 at another angle, to improve the power of the camera 4 in resolving the force, thereby further improving the reliability.

Optionally, the first buffer member 6 may be a flexible member such as foam or soft rubber. In addition, the first buffer member 6 may provide buffering through its own deformation. Corresponding to the first buffer member 6, the second buffer member 7 may also be a flexible member such as foam or soft rubber. Similarly, the second buffer member 7 can provide buffering through its own deformation with low costs and a good buffering effect.

In some embodiments, the mainboard support 3 includes a main support 31 and a mounting support 32. The mounting support 32 is connected to a side of the main support 31 adjacent to the frame 11, connected to the frame 11, and provided with a mounting groove on a side facing the camera 4. The mounting groove forms the second mounting portion 30. In this way, the camera 4 can be mounted inside the mounting groove, and the mounting groove is used to provide support for the camera 4, which, on the one hand, can improve the stability and reliability of the camera 4, and on the other hand, can reduce a space occupied by the mounting cavity, thereby preventing the overall thickness of the electronic device 100 from being greatly affected.

Optionally, the mounting support 32 includes a connecting portion 321 and a supporting portion 322. The connecting portion 321 is connected to the main support 31. The supporting portion 322 is connected to a side of the connecting portion 321 adjacent to the camera 4 and is connected to the frame 11 and the camera 4 respectively. The connection between the mounting support 32 and the frame 11 can improve the stability of the camera 4 to some extent and reduce impact on the camera 4 when the electronic device 100 is subject to an external force, thereby further reducing the probability of damage to and cracking of the camera 4 and display screen 2.

As shown in FIG. 2 and FIG. 4, a second end of the frame 11 in the thickness direction is provided with a sink 111. The supporting portion 322 has a boss 323, and the boss 323 is abutted against and matches the sink 111. Therefore, the mounting support 32 may be connected to the frame 11, which is convenient for processing and assembly, and provides high reliability. It may be understood that there may be a plurality of sets of bosses 323 and sinks 111 in a one-to-one correspondence, thereby providing better support and protection for the camera 4.

The supporting portion 322 may optionally be a metal member. The connecting portion 321 may optionally be a plastic member. The supporting portion 322 may be connected to the connecting portion 321 in an injection-molding manner. Optionally, a size a by which the boss 323 extends into the sink 111 satisfies: a≥0.25 mm.

In other words, the supporting portion 322 is a metal plastic injection-molded member. The boss 323 overlaps with the sink 111. The size by which the boss 323 extends into the sink 111 is at least 0.25 mm. For example, the boss 323 may extend into the sink 111 by 0.25 mm, 0.3 mm, 0.4 mm, or the like, which can improve the strength of the mounting support 32 while allowing the boss 323 and the sink 111 to have some manufacturing errors, thereby reducing the costs.

Based on the above, in the electronic device 100 according to this embodiment of the present disclosure, the distance between the camera 4 and the display screen 2 can be reduced. The camera 4 is supported by the skirt of the camera support 5. The camera support 5, the first buffer member 6, and the second buffer member 7 are configured to provide buffering. The mainboard support 3 is lapped on the sink 111 by using the boss 323. The camera 4 is mounted inside the mounting groove, to provide support and protection for the camera 4, so that the power of the camera 4 in resolving an external force is improved when the camera 4 is stressed, and problems of cracking of the display screen 2 and degradation of the resolving power of the front-facing camera are resolved, to reduce the size of the viewing aperture on the display screen 2 while increasing the display ratio, thereby providing a better user experience.

The above embodiments of the present disclosure focus on describing differences between the embodiments. Different optimization features between the embodiments may be combined to form a better embodiment as long as the optimization features are not contradictory. For brief description, details are not described herein again.

The embodiments of the present disclosure are described above with reference to the accompanying drawings. However, the present disclosure is not limited to the foregoing specific implementations. The foregoing specific implementations are merely illustrative rather than limitative. A person of ordinary skill in the art may derive various forms from the present disclosure without departing from the spirit of the present disclosure and the scope claimed by the claims, which are all under the protection of the present disclosure.

What is claimed is:

1. An electronic device, comprising:
a housing, wherein a first mounting portion is arranged on the housing;
a display screen, wherein the display screen is mounted on the housing, a mounting cavity is formed between the display screen and the housing, and the display screen has a light-transmitting hole;
a mainboard support, mounted on the housing, located inside the mounting cavity, and arranged spaced apart from the display screen, wherein a second mounting portion is arranged on the mainboard support; and
a camera, located inside the mounting cavity, arranged facing the light-transmitting hole, and matching the first mounting portion and the second mounting portion respectively, to be positioned between the housing and the mainboard support, wherein
a distance n between the camera and the display screen satisfies: 0.15 mm≤n<0.4 mm;
wherein the housing comprises:
a frame, wherein the display screen is mounted at a first end in a thickness direction of the frame, the first mounting portion is located inside the mounting cavity, connected to the frame, arranged adjacent to the display screen, and provided with a first mounting through hole, the camera penetrates through the first mounting through hole and corresponds to the light-transmitting hole;
wherein the electronic device comprises: a camera support, sleeved on the camera, connected to the first mounting portion, and provided with a second mounting through hole, wherein the camera penetrates through the second mounting through hole,
wherein the mainboard support comprises a main support and a mounting support, wherein the mounting support is connected to a side of the main support adjacent to the frame, connected to the frame, and provided with a mounting groove on a side of the mounting support facing the camera, wherein the mounting groove forms the second mounting portion, and the camera is mounted inside the mounting groove.

2. The electronic device according to claim 1, further comprising a first buffer member, connected between the camera and the first mounting portion.

3. The electronic device according to claim 2, wherein the first buffer member is located on a side of the first mounting portion away from the display screen.

4. The electronic device according to claim 3, wherein the first buffer member is connected between the camera and the camera support.

5. The electronic device according to claim 4, wherein the camera support comprises:
a first carrying portion, wherein in the thickness direction of the frame, one end of the first carrying portion is connected to the first mounting portion, and an other end of the first carrying portion is connected to the first buffer member,
a second carrying portion, located on a side of the camera away from the frame and located, in the thickness direction of the frame, on a side of the first carrying portion away from the display screen, wherein in the thickness direction of the frame, the first mounting portion is abutted against one end of the second carrying portion and the camera is abutted against an other end of the second carrying portion; and
a connecting portion, located between the first carrying portion and the second carrying portion, wherein one end of the connecting portion is connected to a radially outer end of the first carrying portion, and an other end of the connecting portion is connected to the second carrying portion.

6. The electronic device according to claim 5, wherein the first buffer member is ring-shaped, the first carrying portion is constructed as an annular carrying portion, and a size m of the second carrying portion in the thickness direction of the frame satisfies: m≥0.3 mm.

7. The electronic device according to claim 6, wherein a maximum diameter L of the light-transmitting hole satisfies: L≤10 mm.

8. The electronic device according to claim 5, wherein a maximum diameter L of the light-transmitting hole satisfies: L≤10 mm.

9. The electronic device according to claim 4, wherein a maximum diameter L of the light-transmitting hole satisfies: L≤10 mm.

10. The electronic device according to claim 3, further comprising: a second buffer member, connected between the camera and the second mounting portion.

11. The electronic device according to claim 10, wherein a maximum diameter L of the light-transmitting hole satisfies: L≤10 mm.

12. The electronic device according to claim 3, wherein the housing further comprises:
a back cover, connected to the frame, and matching both the frame and the display screen to form the mounting cavity.

13. The electronic device according to claim 3, wherein a maximum diameter L of the light-transmitting hole satisfies: L≤10 mm.

14. The electronic device according to claim 2, wherein a maximum diameter L of the light-transmitting hole satisfies: L≤10 mm.

15. The electronic device according to claim 1, wherein the mounting support comprises a connecting portion and a supporting portion, wherein the connecting portion is connected to the main support, and the supporting portion is connected to a side of the connecting portion adjacent to the camera and is connected to the frame and the camera respectively.

16. The electronic device according to claim 15, wherein a second end of the frame in the thickness direction is provided with a sink, the supporting portion has a boss, and the boss is abutted against and matches the sink.

17. The electronic device according to claim 16, wherein a size a by which the boss extends into the sink satisfies: a≥0.25 mm.

18. The electronic device according to claim 16, wherein the supporting portion is a metal member, the connecting portion is a plastic member, and the supporting portion is connected to the connecting portion in an injection-molding manner.

19. The electronic device according to claim 1, wherein a maximum diameter L of the light-transmitting hole satisfies: L≤10 mm.

* * * * *